(12) United States Patent
Chauvin et al.

(10) Patent No.: US 9,745,181 B2
(45) Date of Patent: Aug. 29, 2017

(54) METHOD OF DEGASIFICATION OF A CARBONATED BEVERAGE-FILLED CONTAINER

(75) Inventors: Guillaume Chauvin, Singapore (SG); Damien Kannengiesser, Golbey (FR)

(73) Assignee: DISCMA AG, Hunenberg (CH)

( * ) Notice: Subject to any disclaimer, the term of this patent is extended or adjusted under 35 U.S.C. 154(b) by 476 days.

(21) Appl. No.: 14/236,827

(22) PCT Filed: Aug. 2, 2012

(86) PCT No.: PCT/EP2012/065114
§ 371 (c)(1),
(2), (4) Date: Feb. 3, 2014

(87) PCT Pub. No.: WO2013/020883
PCT Pub. Date: Feb. 14, 2013

(65) Prior Publication Data
US 2014/0174032 A1    Jun. 26, 2014

(30) Foreign Application Priority Data

Aug. 8, 2011 (EP) ..................................... 11176854

(51) Int. Cl.
*B65B 31/00* (2006.01)
*B67C 3/22* (2006.01)
(Continued)

(52) U.S. Cl.
CPC .............. *B67C 3/222* (2013.01); *B29C 49/46* (2013.01); *B29C 49/58* (2013.01); *B65B 3/022* (2013.01);
(Continued)

(58) Field of Classification Search
CPC .. B65B 3/022; B65B 3/22; B65B 3/18; B65B 3/24; B29C 49/46; B29C 49/58; B67C 3/222; B67C 3/26; B67C 2003/2674
(Continued)

(56) References Cited

U.S. PATENT DOCUMENTS 1,686,811 A * 10/1928 Greenhouse .............. B67C 3/04
141/305
3,380,488 A *  4/1968 Herbst ...................... B67C 3/06
141/39
(Continued)

FOREIGN PATENT DOCUMENTS

DE           1127241 B      4/1962
DE           4324592 C1     1/1995
(Continued)

*Primary Examiner* — Timothy L Maust
*Assistant Examiner* — Randall Gruby
(74) *Attorney, Agent, or Firm* — Eric J. Sosenko; Jonathan P. O'Brien; Honigman Miller Schwartz and Cohn LLP (57) ABSTRACT

The invention concerns a method of degasification of a carbonated beverage-filled container in an apparatus for blowing and filling containers, the apparatus comprising: —a mold (12) enclosing a blown and carbonated beverage-filled container (14) that comprises a dispensing opening (16), —an injection head (24) that is movable along a longitudinal axis (A) passing by the dispensing opening of the container between a sealing position in which the injection head is in a sealing engagement with the dispensing opening and a non-sealing position in which the injection head is at a distance from the dispensing opening, characterized in that the method comprises the following steps: i) moving the injection head (24) away from the sealing position (3A) to a non-sealing position (3B). ii) moving back the injection head to the sealing position (30), (Continued)

Close
(OutPut 12=1)

iii) moving the injection head away from the Position sealing position to a non-sealing position (3D).

7 Claims, 8 Drawing Sheets

(51) Int. Cl.
    *B65B 3/02*         (2006.01)
    *B65B 3/22*         (2006.01)
    *B29C 49/58*       (2006.01)
    *B29C 49/46*       (2006.01)
    *B29C 49/06*       (2006.01)

(52) U.S. Cl.
    CPC ............... *B65B 3/22* (2013.01); *B29C 49/06* (2013.01); *B29C 2049/4664* (2013.01); *B29C 2049/5827* (2013.01); *B29C 2049/5862* (2013.01); *B29C 2049/5865* (2013.01); *B29C 2049/5868* (2013.01)

(58) Field of Classification Search
    USPC ....... 141/4, 5, 7, 63, 64, 65, 85, 89; 53/452, 53/456, 467, 473, 475, 79, 558, 574–579
    See application file for complete search history.

(56) References Cited

U.S. PATENT DOCUMENTS

| | | | | |
|---|---|---|---|---|
| 3,415,295 A * | 12/1968 | Wolf | ................. | B67C 3/06 137/433 |
| 3,645,303 A * | 2/1972 | Carter | ................. | B67C 3/2614 141/59 |
| 4,319,613 A * | 3/1982 | Mette | ................. | B67C 3/2628 141/147 |
| 4,403,940 A * | 9/1983 | Krishnamumar | ....... | B29C 49/58 425/529 |
| 5,038,548 A * | 8/1991 | Sieg | ................. | B65B 3/22 141/103 |
| 5,063,978 A * | 11/1991 | Walusiak | ................. | B67C 3/26 141/144 |
| 6,464,486 B1 * | 10/2002 | Barray | ................. | B29C 49/58 425/535 |
| 6,599,948 B1 * | 7/2003 | Hammond | ............. | B01D 19/02 516/115 |
| 7,004,745 B2 * | 2/2006 | Galloni | ................. | B29C 49/12 264/532 |
| 7,473,388 B2 * | 1/2009 | Desanaux | ................. | B29C 49/46 264/524 |
| 7,878,794 B2 * | 2/2011 | Rousseau | ................. | B29C 49/58 425/535 |
| 8,026,288 B2 * | 9/2011 | Takenouchi | ....... | B01D 19/0073 137/12.5 |
| 8,109,756 B2 * | 2/2012 | Doudement | ............ | B29C 49/56 425/535 |
| 8,349,246 B2 * | 1/2013 | Sperka | ................. | B29C 49/58 264/522 |
| 8,361,377 B2 * | 1/2013 | Gillet | ................. | B29C 49/4823 264/523 |
| 8,434,530 B2 * | 5/2013 | Conforti | ................. | B67C 3/10 141/105 |
| 8,602,771 B2 * | 12/2013 | Eudier | ................. | B29C 49/12 425/529 |
| 8,827,688 B2 * | 9/2014 | Maki | ................. | B29D 22/003 425/524 |
| 2003/0077349 A1 * | 4/2003 | Derouault | ........... | B29C 49/4205 425/145 |
| 2003/0118686 A1 * | 6/2003 | Voth | ................. | B29C 49/42 425/529 |
| 2008/0029928 A1 * | 2/2008 | Andison | ................. | B29C 49/46 264/238 |
| 2008/0254160 A1 * | 10/2008 | Rousseau | ................. | B29C 49/58 425/535 |
| 2008/0286402 A1 * | 11/2008 | Mie | ................. | B29C 49/58 425/525 |
| 2009/0212071 A1 * | 8/2009 | Tom | ................. | B65B 31/003 222/95 |
| 2010/0143531 A1 * | 6/2010 | Derrier | ................. | B29C 49/58 425/535 |
| 2010/0151073 A1 * | 6/2010 | Daniel | ................. | B29C 49/58 425/522 |
| 2010/0213629 A1 * | 8/2010 | Adriansens | ............. | B29C 49/78 264/40.5 |
| 2011/0135778 A1 * | 6/2011 | Andison | ................. | B29C 49/46 425/524 |
| 2011/0265433 A1 * | 11/2011 | Chauvin | ............. | B29D 22/003 53/558 |
| 2011/0268855 A1 * | 11/2011 | Chauvin | ................. | B29C 49/46 426/407 |
| 2011/0272060 A1 * | 11/2011 | Clusserath | ................. | B67C 3/22 141/11 |
| 2011/0285063 A1 * | 11/2011 | Chauvin | ................. | B29C 49/46 264/525 |
| 2012/0266567 A1 * | 10/2012 | Haesendonckx | ....... | B65B 3/022 53/456 |
| 2013/0106027 A1 * | 5/2013 | Maki | ................. | B29D 22/003 264/524 |
| 2013/0180219 A1 * | 7/2013 | Chauvin | ................. | B65B 3/022 53/559 |
| 2013/0326998 A1 * | 12/2013 | Hartwig | ................. | B29B 11/14 53/453 |
| 2015/0021833 A1 * | 1/2015 | Chauvin | ................. | B29C 49/12 264/524 |
| 2015/0075119 A1 * | 3/2015 | Chauvin | ................. | B29C 49/46 53/453 |
| 2015/0183150 A1 * | 7/2015 | Chauvin | ................. | B29C 49/46 428/36.92 |
| 2015/0298828 A1 * | 10/2015 | Klatt | ................. | B29C 49/12 53/452 |

FOREIGN PATENT DOCUMENTS

| | | |
|---|---|---|
| GB | 1474044 A | 5/1977 |
| WO | 2011/076167 A1 | 6/2011 |

* cited by examiner

METHOD OF DEGASIFICATION OF A CARBONATED BEVERAGE-FILLED CONTAINER

CROSS REFERENCE TO RELATED APPLICATIONS

The present application is a National Stage of International Application No. PCT/EP2012/065114, filed on Aug. 2, 2012, which claims priority to European Patent Application No. 11176854.5, filed Aug. 8, 2011, the entire contents of which are being incorporated herein by reference.

FIELD OF THE INVENTION

The invention relates to a method of degasification of a carbonated beverage-filled container in an apparatus for blowing and filling containers and an associated apparatus.

BACKGROUND

Plastic containers such as bottles of water are manufactured and filled according to different methods including blow moulding or stretch-blow moulding.

According to one of these known methods a plastic preform is first manufactured through a moulding process and then heated before being positioned inside a mould.

The preform usually takes the form of a cylindrical tube dosed at ifs bottom end and open at its opposite end.

Once the preform has been positioned within the mould only the open end of the preform is visible from above the mould.

This method makes use of a stretch rod which is downwardly engaged into the open end of the preform so as to abut against the dosed bottom end thereof. The stretch rod is further actuated to be urged against the closed end, thereby resulting in stretching the preform.

After the stretching phase has been initiated a liquid is also injected into the preform through its open end. This liquid injection causes expansion of the preform until coming into contact with the inner walls of the mould, thereby achieving the final shape of the bottle.

When the liquid injected into the perform contains dissolved gas, such as sparkling water or any other carbonated beverage, venting of the opening of the bottle to atmospheric pressure has to be performed before closing the opening with a cap.

Today, venting to atmospheric pressure is currently being performed by opening a communication channel between the opening of the bottle and the ambient ID atmospheric pressure. In the field of bottle blowing this process is referred to as a degasification process.

However, there exists a need for an improved method enabling degasification or venting to atmospheric pressure of a container filled with a carbonated beverage.

SUMMARY OF THE INVENTION

In this respect, the invention provides for a method as defined in claim 1.

This method makes it possible to achieve degasification of the carbonated beverage in the container thanks to appropriate movements of the injection head with respect to the opened container. The successive movements of the injection head enable controlled and progressive communication of the inside of the container with ambient pressure. Put it another way, this method enables efficient venting of the dispensing opening of the container to atmospheric pressure. Thus, these movements of the injection head along the longitudinal axis cause smooth and efficient degasification of the carbonated beverage.

It is to be noted that the aim of the method is not to completely remove the gas from the container even though the method has been qualified as a degasification method.

More particularly, the first step triggers the venting process and enables first controlled partial venting to atmospheric pressure of the filled container. Return movement of the injection head is next carried out so as to avoid foaming and over-spilling. It is to be noted that during the first step the injection head may be moved away faster than in the prior art due to the above-mentioned next return movement. Once the injection head has returned to its sealing position it is then maintained in this position for a predetermined time period. This holding step or phase helps avoid foaming and over-spilling since it enables stabilization of the venting process. In the course of the last step (step iii)), the venting process goes on in a controlled manner and the injection head moves away from its sealing position to a non-sealing position in which venting to atmospheric pressure of the container is achieved. The velocity of the injection head and the duration of the steps depend notably on the carbonated beverage carbonation rate, etc.)

Generally speaking, the injection head is above the mould and the opened container and in alignment with the mould and the container along a vertical axis or an axis that is inclined with respect to the vertical axis at an angle that is less than 90°.

Thus, the movements of the injection head are generally referred to as upward and downward movements.

According to a possible feature, the method further comprises a step iv) of moving the injection head further away from the sealing position to a further non-sealing position and at a higher velocity than in step iii).

This further step makes it possible to attain a short cycle time.

According to one possible feature, at step i) the injection head is moved to a first or sea position.

According to one possible feature, the first non sealing position is at a short distance from the sealing position.

This small displacement of the injection head creates a small gap between the latter and the surface of the container (example: dispensing opening) with which the injection head was in a sealing engagement prior to this movement.

The small gap allows a first communication between the space around and inside the dispensing opening and the outside atmospheric pressure to be established.

This allows a smooth pre-venting to the atmospheric pressure instead of a first too great displacement. The value of the gap or distance depends on the velocity of the injection head when moving away from its sealing position and the duration of the movement.

It is also to be noted that this first movement away from the sealing position to the first non-sealing position is performed slowly so as to be able to achieve a small displacement.

This first step makes it possible to obtain slow degasification of the carbonated beverage which avoids foaming and overspilling.

The velocity of this first movement away of the injection head has to be chosen in accordance with the carbonation rate of the beverage. The more carbonated, the slower.

The maximum velocity to be selected irrespective of the carbonation rate is the velocity at which it will be possible to keep the beverage within the container while having the shortest cycle time as possible.

According to a further feature, at step iii) the injection head is moved to a second non-sealing position that is farther than the first non-sealing position from the sealing position.

Once the injection head has already been moved at step i) away from the sealing position to a first non-sealing position, pre-venting to atmospheric pressure has already been carried out. This makes it possible at step iii) to move the injection head farther than the first non-sealing position from the sealing position without causing foaming and over-spilling.

According to another possible feature, at step iv) the injection head is moved to a third non-sealing position that is farther than the second non-sealing position from the sealing position.

Thanks to progressive venting to atmospheric pressure a third non-sealing position of the injection head may be obtained during the process.

According to one possible feature, at step i) the injection head is moved during a first period of time.

According to another possible feature, at step it the injection head is moved back during a second period of time that is shorter than the first period of time.

According to one possible feature, at step iii) the injection head is moved during a third per of time that is longer than the first period of time.

This movement away from the sealing position lasts more than the first movement to the first non-sealing position and is performed at the same pace.

This enables a farther non-sealing position to be reached while progressively venting the dispensing opening of the container to atmospheric pressure.

This slow and longer movement also contributes to avoiding foaming and over-spilling.

It is to be noted that in other embodiments step iii) does not necessarily last more than step i) and the second non sealing-position may correspond to the first non-sealing position or not.

According to one possible feature, the method comprises a step of controlling the movements of the injection head along the longitudinal axis. By controlling the movements of the injection head along the longitudinal axis it is thus possible to move the injection head accurately and efficiently so as to achieve the desired result.

According to one possible feature, the method comprises a step of controlling at least one actuator the actuation of which causes the injection head to move accordingly. More specifically, the movements of the injection head are controlled by controlling the at least one actuator which causes the actuation of the injection head.

By way of example, the at least one actuator is a fluid-operated actuator which actuates the injection head.

The fluid may be air or a liquid such as oil or water.

It is to be noted that other types of actuators may be envisaged such as electric-operated actuators.

According to one possible feature, the step of controlling the fluid-operated actuator comprises a sub-step of controlling the supply of fluid to said fluid-operated actuator.

According to one possible feature, the sub-step of controlling the supply of fluid to the fluid-operated actuator comprises controlling a main valve and a secondary valve.

By controlling the operating status of a main valve and a secondary valve, that is their opening and closing state, it is thus possible to control the supply of fluid to the fluid-operated actuator and then the movement to be achieved by the injection head.

According to one possible feature, steps i) to iii) are performed by controlling the supply of fluid to the fluid-operated actuator through the main valve.

The main valve is responsible for the performance of steps i) to iii).

For instance, these steps are respectively performed by closing, opening and closing the main valve.

It is to be noted, however, that these steps may be alternatively performed by operating the main valve differently and for instance, by successively opening, closing and opening the latter.

According to one possible feature, step iv) is performed by controlling the supply of fluid to the fluid-operated actuator through the secondary valve.

The secondary valve is responsible for performing step iv). However, it is to be noted that step iv) is performed while simultaneously controlling the supply of fluid to the fluid-operated actuator through the main valve.

Thus, during step iv) the secondary valve is operated together with the main valve to achieve the desired result, that is accelerating the movement away of the injection head.

For instance, the secondary valve is opened in order to carry out step iv).

However, the secondary valve may be alternatively operated differently to achieve the same result and for instance, it can be closed.

The design or the arrangement of a fluid circuit comprising the main valve and the secondary valve connected to the at least one fluid-operated actuator may vary.

In particular, the design may vary if the movement of the injection head away from the sealing position is controlled by the opening of the main valve or its closing.

The same applies to the secondary valve.

According to the invention, there is also provided an apparatus for blowing and filling containers, comprising:

a mould enclosing a blown and carbonated beverage-filled container that comprises a dispensing opening, an injection head that is movable along a longitudinal axis passing by the dispensing opening of the container between a sealing position in which the injection head is in a sealing engagement with the dispensing opening and a non-sealing position in which the injection head is at a distance from the dispensing opening, means for moving the injection head, characterized in that said means for moving the injection head are operable to perform the following steps:

i) it move the injection head away from the sealing position to a non-sealing position, ii) in move back the injection head to the sealing position, iii) move the injection head away from the sealing position to a non-sealing position.

The above apparatus is operable to perform the steps of the method set out in claim 1 in a very simple manner.

The method is advantageous in that its implementation does not give rise to substantial modifications to a conventional apparatus for blowing and filling containers.

It is to be noted that this progressive degasification process is shorter in time in total compared to a single continuous movement of the injection head away from the sealing position.

This has been achieved thanks to a two-step movement of the injection head away from the sealing position separated one from another by a return movement to the sealing position.

As already mentioned above for the method, the means for moving the injection head are also operable to hold the injection head in its sealing position for a predetermined period of time.

According to one possible feature, said means for moving the injection head are further operable to perform a step iv) of moving the injection head further away from the sealing position to a further non-sealing position and at a higher velocity than in step iii).

According to one possible feature, the apparatus comprises means for controlling said means for moving the injection head and causing the latter to move as defined in steps i) to iii) and also step iv), where appropriate.

Thus, means for moving injection head are made operable to perform the steps of the method by appropriately controlling these means.

According to one possible feature, said means for moving the injection head comprise at least one actuator.

By way of example, the at least one actuator is fluid-operated actuator.

According to one possible feature, means for controlling the fluid-operated actuator comprise means for controlling the supply of fluid to said fluid-operated actuator.

The fluid-operated actuator is controlled thanks to the control of the supply of fluid.

In particular, said means for controlling the supply of fluid to the fluid-operated actuator comprise a main valve and a secondary valve.

Thus, a fluid circuit comprising a main valve and a secondary valve is suitably connected to the fluid-operated actuator so as to appropriately control the supply of fluid thereto and cause the injection head to move accordingly.

According to one possible feature, the main valve is operable to supply fluid to the fluid-operated actuator so as to cause the inject on head to move as defined in step i) to iii).

It is to be noted that the main valve is operated differently to perform the movement away and the return movement as respectively defined in steps i) and ii).

According to one possible feature, the secondary valve is operable to supply fluid to the fluid-operated actuator so as to cause the injection head to move as defined in steps iv).

The secondary valve is operable together with the main valve so as to move the injection head as defined in step iv).

According to one possible feature said means for controlling the supply of fluid to the fluid-operated actuator comprise a flow regulator for reducing the flow rate of fluid supplied to the fluid-operated actuator, thereby causing the injection head to move slowly away from the sealing position into a non-sealing position.

This flow regulator enables slowing down of the movement away from the sealing position.

This therefore, provides an improved control of the movement of the injection head.

BRIEF DESCRIPTION OF DRAWINGS

Embodiments of the present invention will now be described, by way of example only, with reference to the accompanying figures in which.

DETAILED DESCRIPTION

Figure 1:
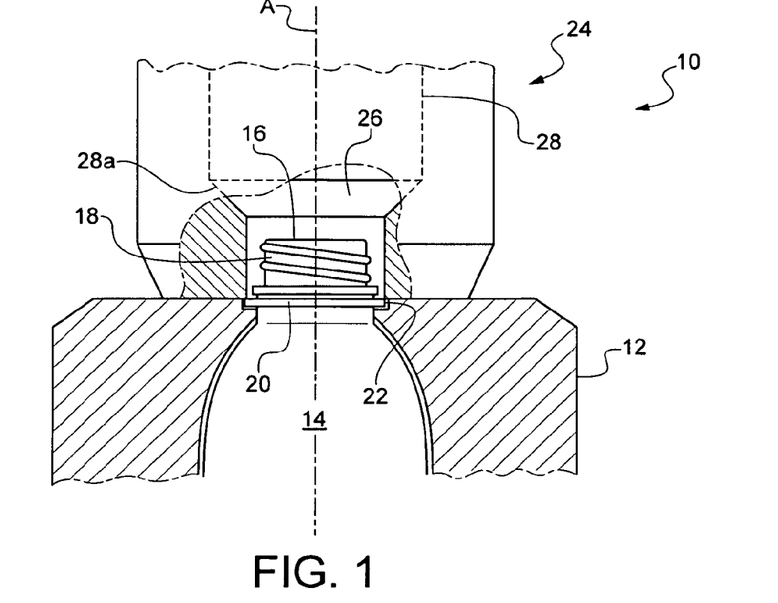
FIG. 1 is a schematic and a partial view of an apparatus for blowing and filling a container.

FIG. 1 is a schematic and a partial view illustrating the main components of an apparatus 10 for blowing and filling a container.

The apparatus 10 comprises a mould 12 enclosing a container 14 such as a bottle.

A bottle which has been manufactured through blow moulding or stretch-blow moulding comprises a dispensing opening 16 having a neck 18 with an outside thread and a flange or neck ring 20 that is provided at the basis of the neck.

The container has been shaped so that the dispensing opening 16 protrudes from the mould 12 above it.

In particular, neck ring 20 rests against a shoulder 22 provided at the upper part of the mould around the container 14.

Apparatus 10 also comprises an injection head 24 which comes into contact with the upper surface of mould 12 or container 14, on the neck ring 20, in the course of performance of the blowing and filling method.

Injection head 24 comprises an injection valve 26 provided in an inner housing 28.

Injection head 24 is substantially cylindrical in shape as partially illustrated in FIG. 1 and inner housing 28 is also cylindrical in shape and both are coaxial.

Once container 14 has been blown and filled with a liquid, injection valve 26 is in a lower position as illustrated in FIG. 1, in a sealing contact with the inner surface 28a of housing 28 so as to prevent any further flow of liquid into container 14 and ensure liquid tight-sealing.

As represented in FIG. 1, a longitudinal axis A which here coincides with the vertical axis, passes by the centre of dispensing opening 16.

Injection head 24 air and mould 12 are substantially aligned along longitudinal axis A.

It is to be noted that axis A is a symmetry axis to container 14.

In the present invention, container 14 has been filled with a liquid containing dissolved gas, such as sparkling water or more generally, any kind of carbonated beverage.

In this embodiment container 14 is a plastic container which has been manufactured according to a known method such as disclosed in Applicant s patent EP 1 529 620 B1.

According to this method, a plastic preform is first manufactured through a moulding process and then heated before being positioned within mould 12.

Mould 12 may be spitted into two or more parts depending on the manufacturing process.

The preform usually assumes the shape of a cylindrical tube dosed at its bottom end and open at its opposite end.

One the preform has been positioned within the mould only the open end of preform is visible from above the mould.

The open end is shaped during the process, thereby leading to dispensing opening 16.

The blowing and filling process makes use of a stretch rod (not represented in the drawing) which is downwardly engaged into the open end of the preform so as to come into contact with the closed bottom end thereof. The stretch rod is then further actuated to push the closed end downwardly and stretch the preform accordingly in a controlled manner.

After the stretching phase has been initiated the liquid mentioned above is injected into the preform through its open end around the stretch rod, while the latter is still being actuated.

This liquid injection causes expansion of the preform together with the movement of the stretch rod until coming into contact with the inner walls of the mould.

The final shape of the container is thus achieved.

When container 14 has been filed with a carbonated beverage dissolved gas is present in the container.

As injection head 24 is in a sealing engagement with dispensing opening 16 and more particularly, with the upper part of the neck ring 20, moving the injection head away from its sealing position (position represented in FIG. 1) will rise up the level of liquid in the container and cause foaming and over-spilling all around the dispensing opening.

The description of the appended drawings will now explain how this problem can be easily addressed.

Figure 2A:
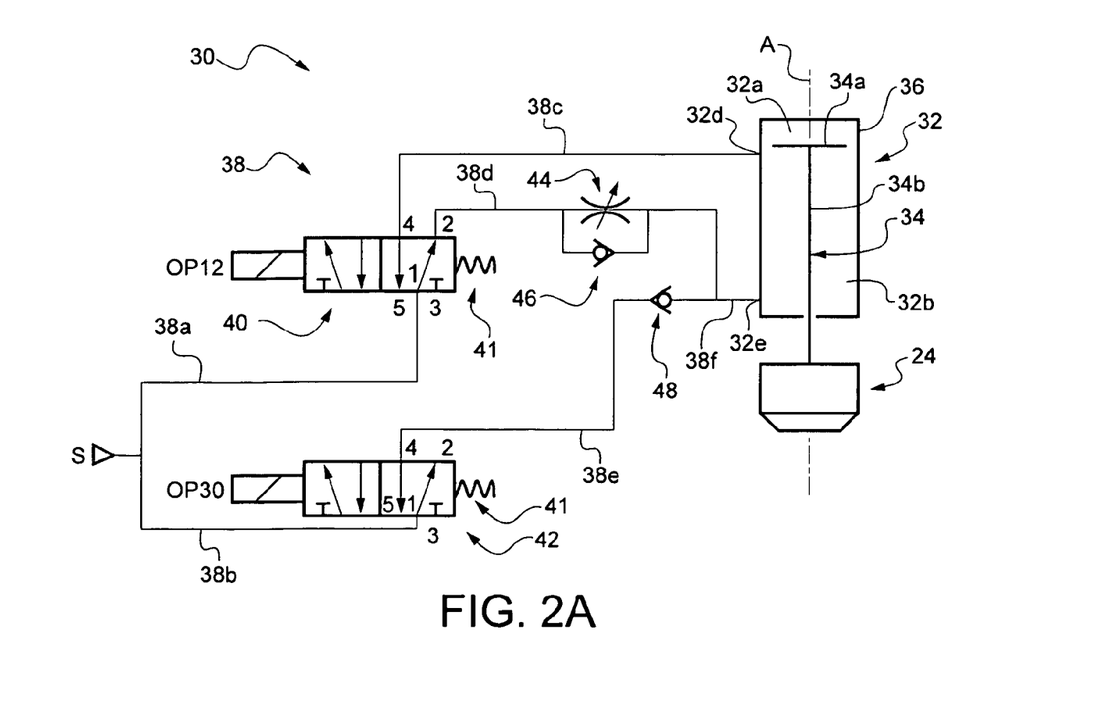
FIG. 2A is a schematic view of fluid circuit system for controlling the movement away and return movement of the injection head.

FIG. 2A illustrates a fluid circuit system 30 the aim of which is to control means for moving the injection head represented in FIG. 1. In FIG. 2A, injection head 24 has been represented in a very schematic manner for the sake of clarity.

As schematically represented in FIG. 2A, means for moving injection head 24 comprise an actuator 32 which is here, by way of example, a fluid-operated actuator.

The injection head is operatively connected to actuator 32 so as to be moved accordingly along longitudinal axis A.

Fluid-operated actuator 32 more particularly comprises a piston 34 that is sliding longitudinally within a cylindrical housing 36 along longitudinal axis A.

Piston 34 has a basis 34a and a rod 34b attached thereto on one end and attached to injection head 24 on the opposite end.

The fluid used for operating actuator 32 is air, for example.

Other fluids such as oil or water may be used alternatively.

Fluid circuit system 30 comprises controlling means 38 for controlling the supply of fluid to actuator 32.

The control of the fluid supply enables appropriate movement of injection head 24.

It is to be noted that in the present embodiment axis A coincides with vertical axis and therefore, the movements of the injection head will be generally referred to as upward and downward movements.

It however does not reduce the scope of the invention, bearing in mind that axis A may be alternatively inclined with respect to vertical axis at an angle that is greater than 0° and less than 90°.

As schematically represented in FIG. 2A, control means 38 comprise a main valve 40, also denoted OP12, that is connected to actuator 32, respectively at two portions thereof. These two portions 32d and 32e are in communication with separate compartments.

The two separate compartments referred to as 32a and 32b in FIG. 2A are separated one from another by the basis 34b of piston 34.

Control means 38 also comprise an additional secondary valve 42, also denoted OP30, and that is operatively connected to actuator 32.

Each main valve 40 and secondary valve 42 is connected to a common source of fluid S.

It is to be noted that each valve may occupy two main positions or states, an open position and a closed position.

More particularly, each valve is, for example, an electrical valve of the 5/2 type, i.e. having 5 orifices and 2 positions. When there is no electrical signal (set to 0) sent to the valve the return spring 41 enables communication between orifices 1 and 2 (feeding) as well as orifices 4 and 5 (discharge). When the electrical signal is set to 1, orifices 1 and 4 (feeding) as well as orifices 2 and 3 (discharge) are in communication.

As more particularly represented in FIG. 2A, control means 38 comprise a first fluid line or duct connecting fluid source S to main valve 40 and a second supply line 38b connecting fluid source S to secondary valve 42.

Control means 38 also comprise another fluid line 38c connecting main valve 40 to the first portion 32d of actuator 32.

Still another line 38d connects main valve 40 to the second portion 32e of actuator 32.

This fluid line also comprises a flow regulator 44 (fluid flow rate reducing means) that is arranged in parallel with an anti-return valve 46.

Control means 38 further comprise a fluid line 38e connecting secondary valve 42 to second portion 32e.

Fluid line 38e also comprises an anti-return valve 48. Fluid lines 38d and 38e have a common portion 38f that is connected to second portion 32e.

As will be more specifically described later on main valve 40 and secondary valve 42 are arranged in parallel so that the fluid flow rate supplied by secondary valve 42 will add to that supplied by mean valve 40 during the last step of the method according to the invention.

The method according to the invention will now be described with reference to FIGS. 2B-E, 3A-D and 4A-C.

Figure 3A:
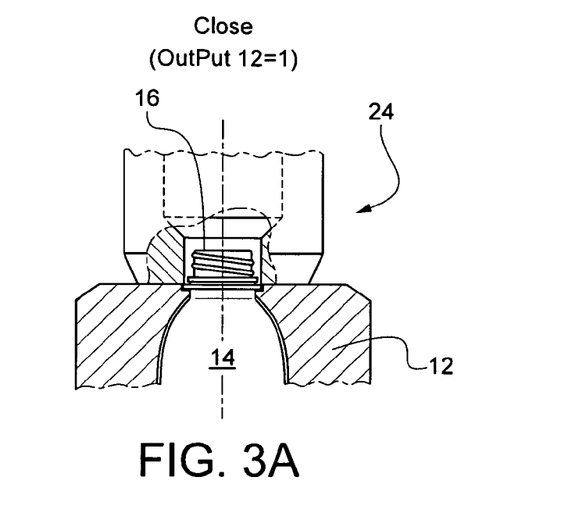
FIGS. 3A-D are successive schematic views analogous to that of FIG. 1 and illustrating the different positions of the injection head in the course of execution of the method according to the invention.

FIG. 3A illustrates the sealing position between injection head 24 and dispensing opening 16 of container 14.

Sealing engagement (fluid tightness) is achieved through known means which will not be described here.

FIG. 3A is identical to FIG. 1.

Starting from the sealing position illustrated in FIG. 3A the method according to the invention makes it possible to degasify the carbonated beverage-field container 14 through several steps or phases which will now be described.

Figure 4A:
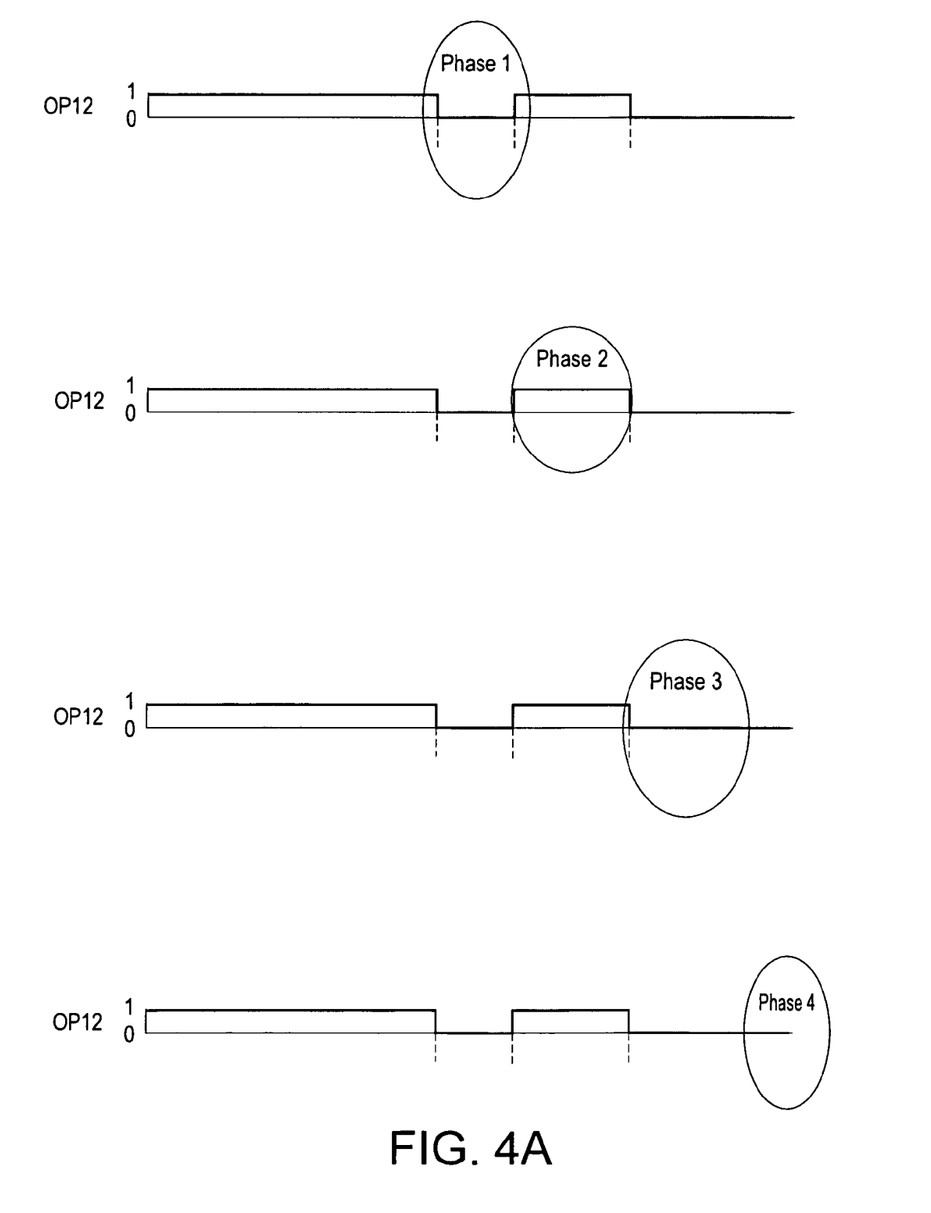
FIGS. 4A-C are time diagrams illustrating respectively the different status (open or dosed) of the main and secondary valves in FIGS. 2A-E system and the corresponding positions of the injection head.
Figure 4B:
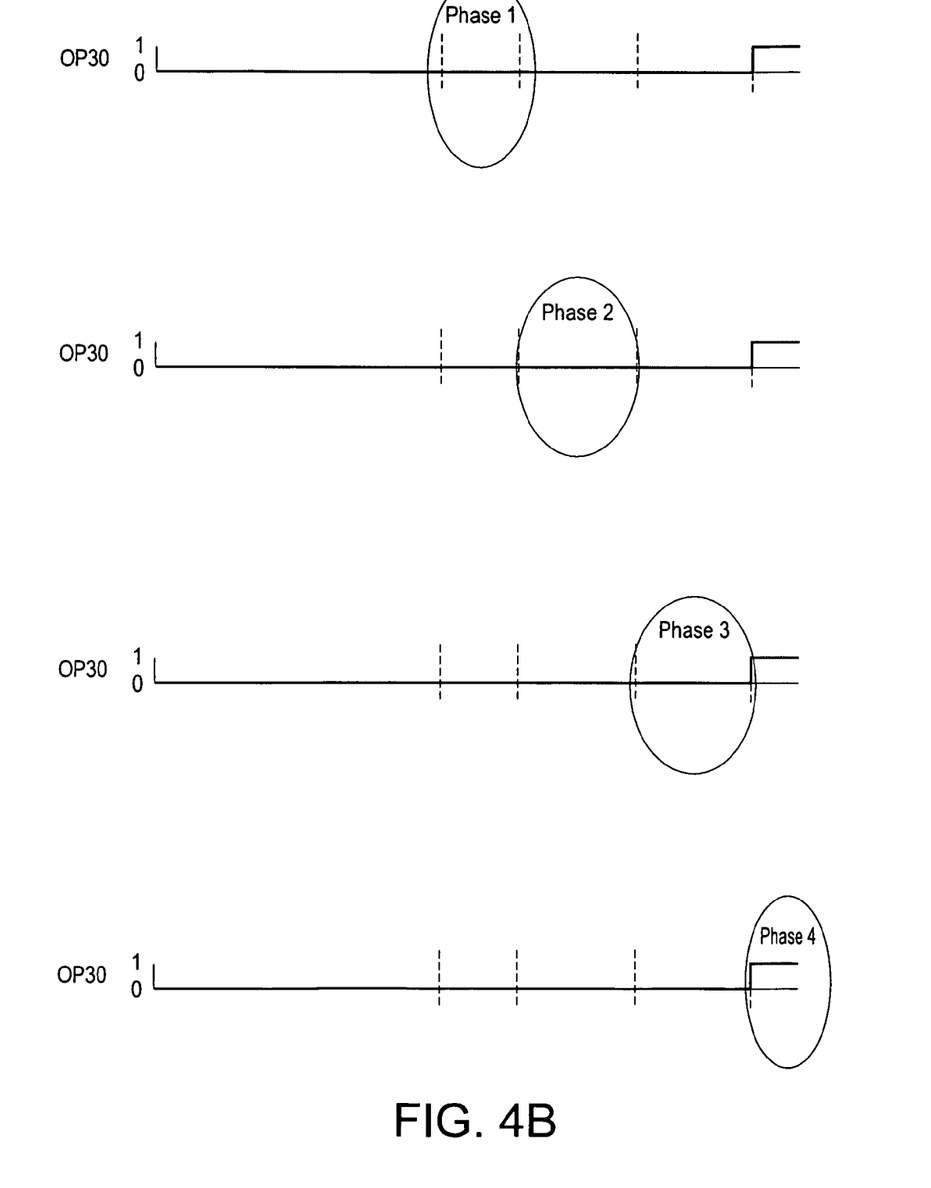
Figure 4C:
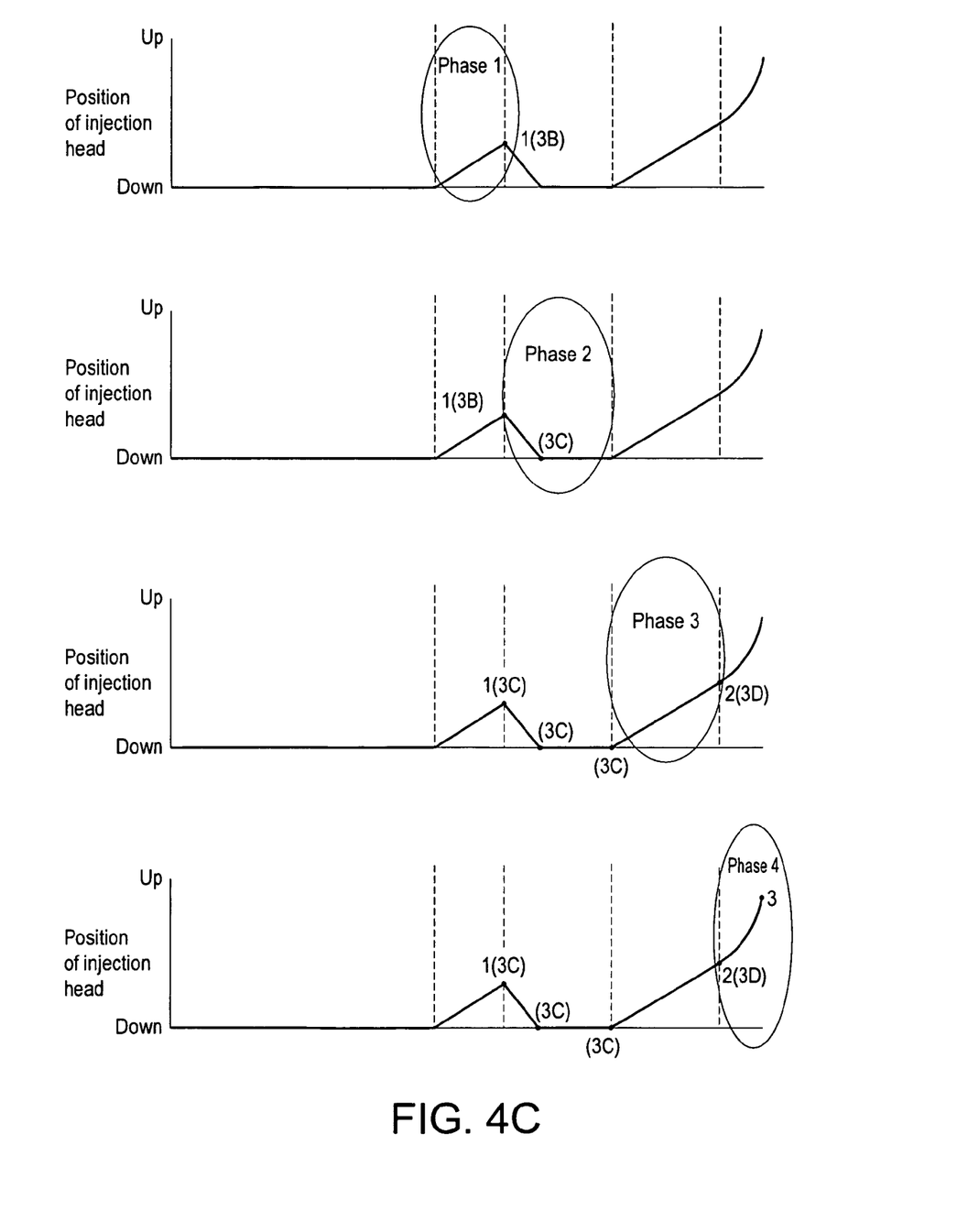

Starting from FIG. 3A sealing position, the method provides for the first step or phase during which injection head 24 is caused to be moved away from the sealing position to a first non-sealing position indicated by 1 in FIG. 4C.

Figure 3B:
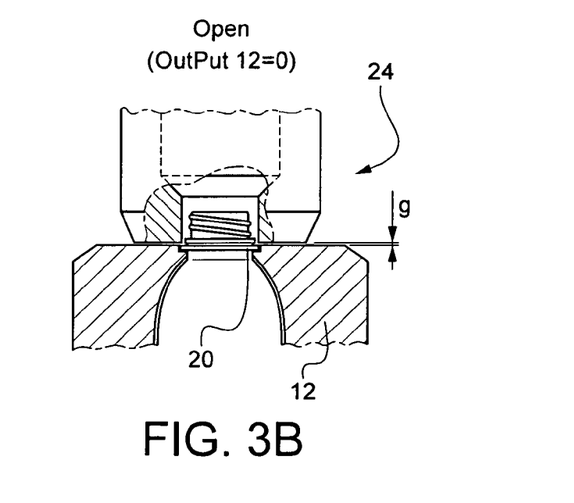

This first non-sealing position is illustrated in FIG. 3B and shows that a small gap "g" is left between injection head 24 and neck ring 20.

Figure 2B:
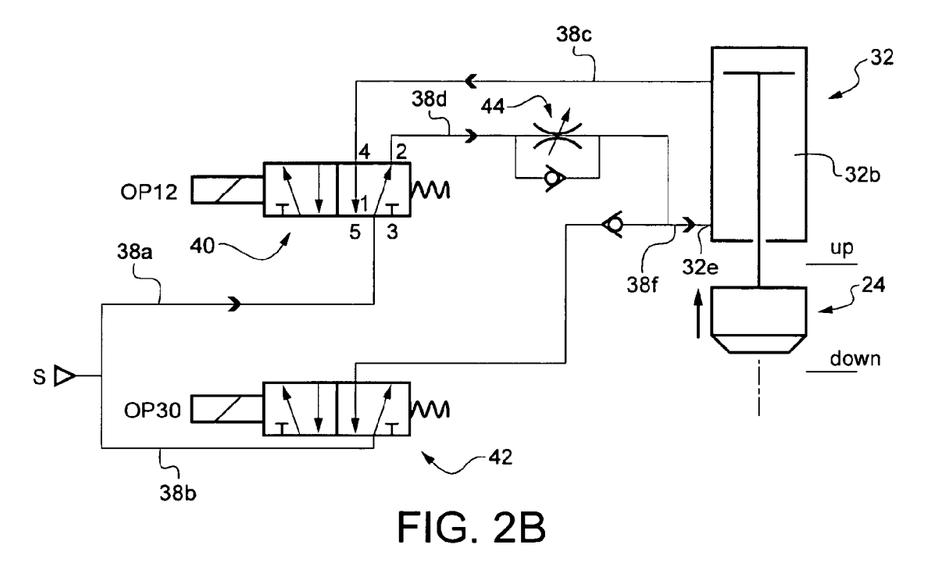
FIGS. 2B-E are successive schematic views analogous to that of FIG. 2A and illustrating the flow of fluid in the fluid circuit system in order to obtain different positions of the injection head in the course of execution of the method according to the invention.

This movement away from the sealing position is achieved through controlling the flow of fluid as illustrated in FIG. 2B.

As represented in FIG. 2B, fluid is supplied from fluid source S to main valve 40 through fluid line 38a, then goes through the latter, flows successively through line 38d, flow regulator 44 and common line 381 to reach second portion 32e of actuator 32.

During this first step or phase main valve 40 is forced to close (changing from state 1 to state 0 in FIG. 4A) and secondary valve 42 is maintained in a closed position (state position at 0 in FIG. 4B), Fluid is therefore supplied to second compartment 32b of actuator 32, thereby rising up injection head 24 and moving it away from the sealing position.

Thanks to fluid flow rate reducing means 44 the upward movement of injection head 24 is relatively slow and efficiently controlled as represented in FIG. 4C.

This first step triggers venting to atmospheric pressure of dispensing opening 16.

The aim of this method is to degasify the carbonated liquid contained in container 14 without foaming.

Figure 2C:
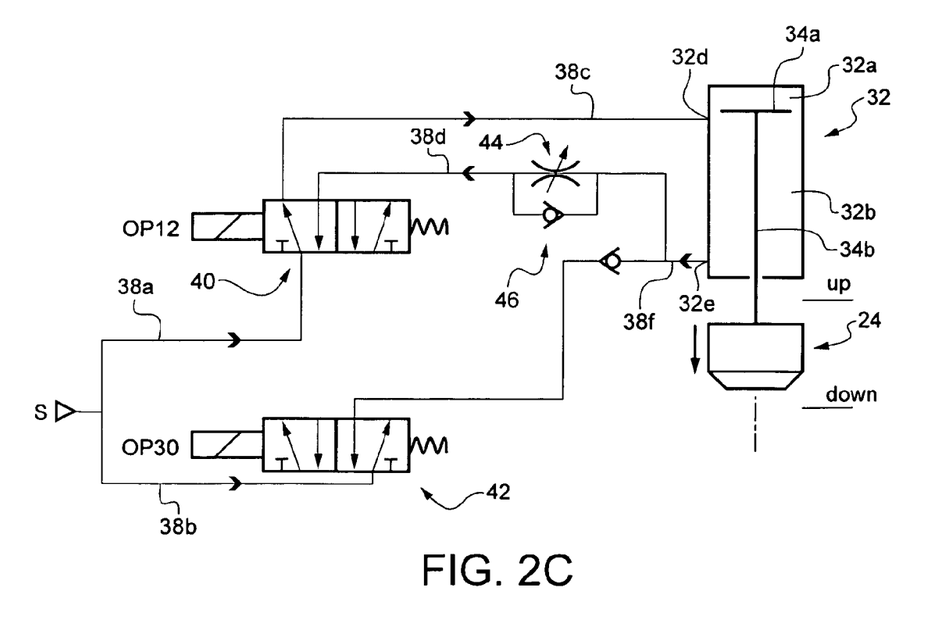
Figure 3C:
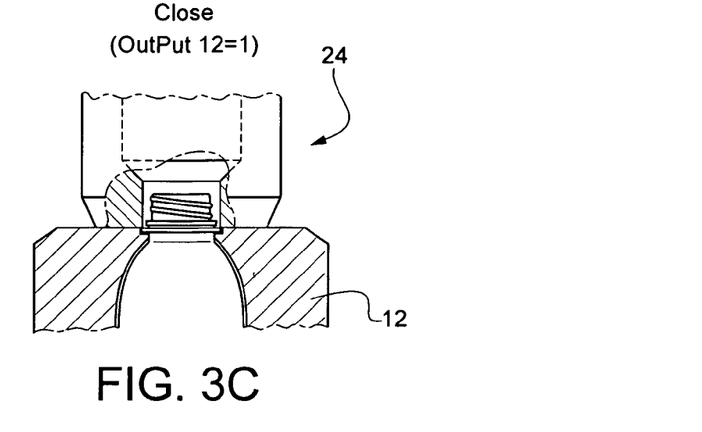

The return movement from position illustrated in FIG. 3B to sealing position illustrated in FIG. 3C is achieved as illustrated in FIG. 2C and FIGS. 4A to 4C.

More particularly, injection head 24 is forced to move back in a downward movement by operating main valve 40 (changing its status from 0 to 1 to open it), while maintaining secondary valve 42 in its closed position (state position to 0).

Opening main valve 40 makes it possible for the fluid to go therethrough and flow through fluid line 38c to first portion of actuator 32d.

This supply of fluid to actuator 32 pushes against basis 34a which therefore causes piston 34b to slide downward together with injection nozzle 24.

Fluid that is present in compartment 32b is therefore expelled through second portion 32e and flows out through successive lines 38f and 38d.

It is to be noted that in this sense of flowing fluid regulator 44 is bi-past thanks to anti-return valve 46.

This arrangement makes it possible to accelerate the return movement of the injection head compared to the movement away during the first step or phase.

It is to be noted that after reaching the sealing position illustrated in FIG. 3C, a further step of moving the injection head away from the sealing position does not start immediately thereafter.

As represented in FIGS. 3C and 4C, main valve 40 is left open during a given period of time before being closed and the sealing position is held during this period of time.

The sealing position is maintained for process stabilization purpose.

The duration of the stabilization step or phase depends on the other steps of moving the injection head so as to enable venting to atmospheric pressure, the velocity of the movements away of the injection head (velocity of cylinder 32) and the liquid or carbonated beverage.

The method according to the invention provides for subsequent steps or phases to move the injection head away from its sealing position.

Figure 3D:
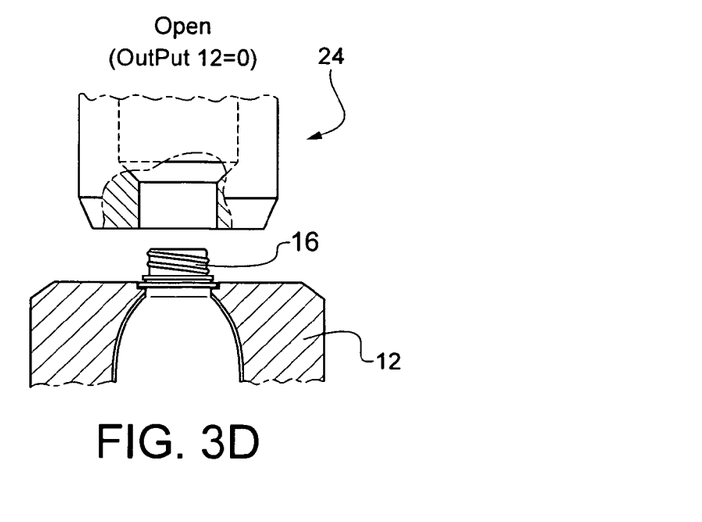

This movement is illustrated starting from FIG. 3C position to reach FIG. 3D position.

Figure 2D:
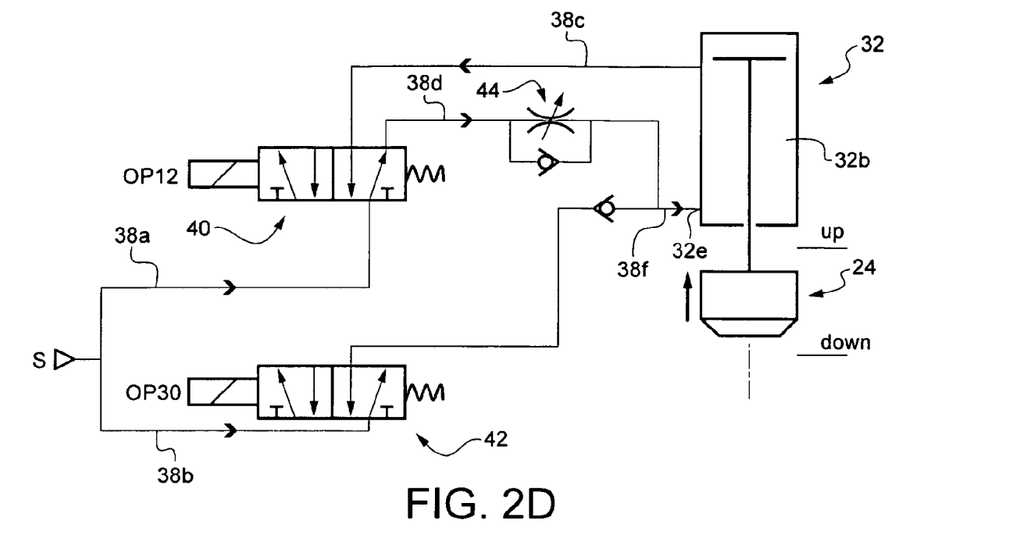

FIG. 2D together with FIG. 4C illustrate a third step or phase of the method.

The third step or phase illustrated in FIGS. 4A-4C is achieved by closing main valve 40 while maintaining secondary valve 42 in a closed position.

During this step, the main valve 40 is maintained in closed position for a longer period of time than the period of time in first step.

The flow of fluid circulates as has been already described with reference to FIG. 2B.

This causes injection head 24 to move away from the seating position illustrated in FIG. 3C at the same velocity as during the first step and during a longer period of time.

This makes it possible to reach a second non-sealing position indicated by 2 in FIG. 4C and that is also illustrated in FIG. 3D.

During this second step of degasifying the liquid (the first step is illustrated in FIGS. 2B and 4C) a slow upward movement of the injection head is still necessary so as to avoid foaming and over-spilling. The reached second non-sealing position 2 is not necessarily farther from the sealing position than the first non-sealing position 1 (see FIG. 4C). Second non-sealing position 2 depends on several process parameters including the type of liquid.

This position as well as the first non-sealing position depend on the velocity of the injection head movements and the duration of the steps.

These parameters have to be adjusted on the apparatus in order to achieve the best possible degasification, notably depending on the liquid (e.g. carbonation rate, etc).

It is to be noted that the velocity of the injection head during the third step or phase may be higher or lower that during the first step or phase, or even equal to depending on the liquid in the container. Also, the duration of the steps may be adjusted accordingly.

Figure 2E:
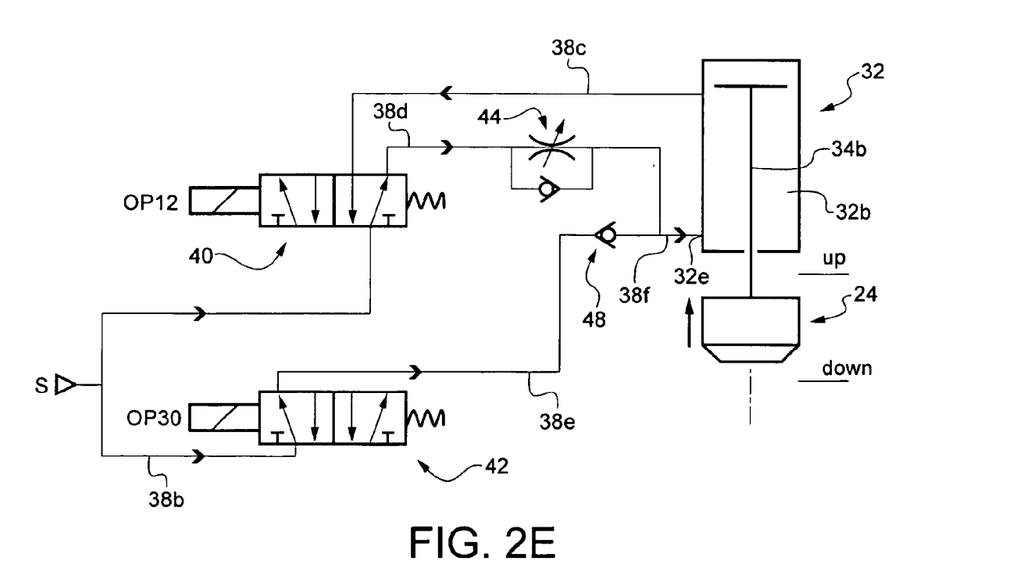

The method according to the invention provides for a further fourth step or phase which enables acceleration of the movement away of the injection head as illustrated in FIGS. 2E and 4C.

During this step or phase injection head 24 is forced to move further away from the FIG. 3C sealing position to a further non-sealing position (indicated by 3 in FIG. 4C).

This upward movement is performed at a higher velocity than the previous upward movement (third step or phase) illustrated in FIG. 2D together with FIG. 4C.

This accelerated movement is achieved thanks to the use of secondary valve 42.

Until now secondary valve 42 remained at state 0 (closed position).

During this fourth step secondary valve 42 is forced to occupy an open position in which fluid that is supplied by fluid source S is sent to secondary valve 42 through line 38b and goes therethrough. It then flows through lines 38e and 38f successively before reaching second portion of actuator 32e.

This flow of fluid is being circulated while at the same time a parallel flow of fluid is being sent through main valve 40, regulator 44 and common line 38f.

This increased amount of fluid is therefore injected into compartment 32b of actuator 32, thereby giving rise to a rapid upward movement of piston 34b) and the attached injection head.

This accelerated movement makes it possible to reduce the overall cycle time.

At the end of this fourth step or phase a third non-sealing position indicated by 3 in FIG. 4C is attained.

When the execution of the steps of the method has come to an end the dispensing opening of the container has been vented to atmospheric pressure. This has been achieved thanks to controlled steps or phases through a progressive venting process. The movements of the injection head are controlled and adjusted so as to cause smooth and efficient degasification of the carbonated beverage.

It is to be noted that if the degasification process were to be executed through a single step of moving the injection head away from its sealing position, then the velocity of the injection head would be less than that of the present invention in order to avoid foaming and over-spilling. Therefore, the cycle time would be longer than that of the present invention.

The invention claimed is:

1. A method of degasification of a carbonated beverage-filled container in an apparatus for blowing and filling containers, the apparatus comprising:
   a mold enclosing a blown and carbonated beverage-filled container, the container including a dispensing opening,
   an injection head that is movable along a longitudinal axis passing by the dispensing opening of the container between a sealing position in which the injection head is in a sealing engagement with the dispensing opening and a plurality of non-sealing positions in which the injection head is at a distance from the dispensing opening, the method comprises the steps:
   moving the injection head away from the sealing position to a first non-sealing position;
   after moving the injection head to the first non-sealing position, moving the injection head back to the sealing position;
   after moving the injection head back to the sealing position, moving the injection head away from the sealing position to a second non-sealing position; and
   after moving the injection head to the second non-sealing position moving the injection head further away from the sealing position to a third non-sealing position and at a higher velocity than the step of moving the injection head to the first non-sealing position.

2. The method of claim 1, wherein the first non-sealing position is at a first distance from the sealing position that is shorter than a second distance from the sealing position to the second non-sealing position.

3. The method of claim 1, wherein each step of moving the injection head comprising controlling at least one actuator the actuation of which causes the injection head to move accordingly.

4. The method of claim 3, wherein the at least one actuator is a fluid-operated actuator which actuates the injection head and controlling the actuator comprises a sub-step of controlling the supply of fluid to the actuator.

5. The method of claim 4, wherein the sub-step of controlling the supply of fluid to the fluid-operated actuator comprises controlling a main valve and a secondary valve.

6. The method of claim 5, wherein moving of the injection head is performed by controlling the supply of fluid to the fluid-operated actuator through the main valve.

7. The method of claim 1, wherein the step of moving injection head to the third non-sealing position is performed by controlling a supply of fluid to a fluid-operated actuator through s secondary valve.

* * * * *